L. D. WOODRUFF.
PIPE COUPLING FOR FLUID PRESSURE COUPLER HEADS.
APPLICATION FILED JULY 3, 1913.
1,123,972.
Patented Jan. 5, 1915.
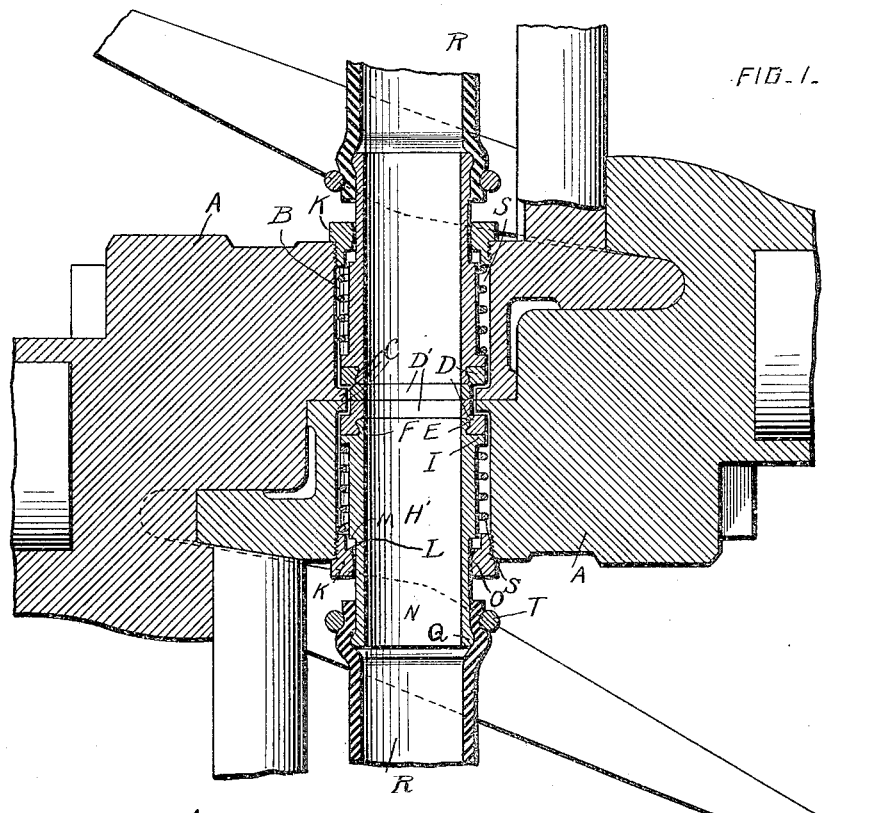
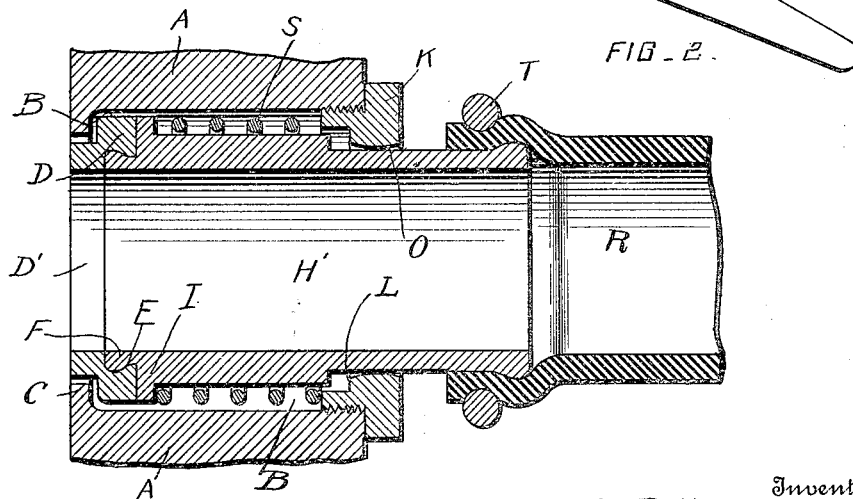

UNITED STATES PATENT OFFICE.

LEONIDAS D. WOODRUFF, OF HATTIESBURG, MISSISSIPPI.

PIPE-COUPLING FOR FLUID-PRESSURE COUPLER-HEADS.

1,123,972.  Specification of Letters Patent.  Patented Jan. 5, 1915.

Application filed July 3, 1913. Serial No. 777,365.

*To all whom it may concern:*

Be it known that I, LEONIDAS D. WOODRUFF, a citizen of the United States, residing at Hattiesburg, in the county of Forrest and State of Mississippi, have invented certain new and useful Improvements in Pipe-Couplings for Fluid-Pressure Coupler-Heads; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in pipe couplings to fluid pressure coupler heads and comprises a simple and efficient device of this nature so arranged that there may be an unobstructed passageway for the fluid and also affording means whereby a fulcrum movement is afforded to compensate for any wearing or irregular shape of the gasket and head.

My invention comprises various details of construction and combinations and arrangements of parts, which will be hereinafter fully described, shown in the accompanying drawings and then specifically defined in the appended claim.

I illustrate my invention in the accompanying drawings, in which:—

Figure 1 is a sectional view through a portion of a coupler head showing the pipe connections therewith, and Fig. 2 is an enlarged sectional detail view of a gasket.

Reference now being had to the details of the drawings by letter, A A designate fluid pressure coupler heads having each a passageway B leading therethrough, the wall of said aperture being provided with an annular shoulder C against which the flange D of a gasket D' is adapted to contact. Said heads, it will be understood, are of complemental construction and adapted to interlock in the manner shown in Fig. 1 of the drawings. Said gasket preferably has an annular groove E formed in the inner surface thereof and is adapted to be engaged by an annular rib F formed at the end of the cylindrical shell H', which latter is provided with an annular flange I adapted to bear against the flange of the gasket.

A threaded ring, designated by letter K, is adapted to engage interior threads in the chambered portion of the coupler head and has preferably an octagonal periphery for convenience in engagement therewith of a wrench or other tool and has an interior annular shoulder L adapted to form a stop to limit the movement of said shell H' in one direction. Said shell, it will be noted, is provided with a contracted part N, terminating in a shoulder M, which latter is adapted to contact with the shoulder L. The inner marginal edge of the opening in the ring K, it will be noted, is convexed as at O and normally contacts with the circumference of the contracted portion of the shell H', allowing the latter to move freely through the ring and, at the same time, serving to allow the shell to tilt slightly in any direction, if desired, and also serving as a means for preventing any foreign matter entering the chamber intermediate the circumference of the shell and said concaved edge of the ring. A hose pipe R is adapted to be fastened to the projecting end of the shell in any suitable manner, as by means of a ring T which holds one end of the pipe over the rib Q formed upon the circumference of the shell.

A coiled spring, designated by letter S, is mounted about the circumference of the shell and bears intermediate the flange I and the inner end of the ring K, the purpose of said spring being to normally hold the gasket D' together and the face of the flange I in contact with the adjacent face of the flange D of the gasket D'.

Upon reference to Fig. 1 of the drawings, it will be noted that a slight space intervenes between the circumferences of the flanges D and I of the gasket and shell respectively, and the wall of the chambered portion of the coupler head, and also a slight space intervenes between the portion of the gasket which projects through the coupler head, these spaces being provided to allow a slight oscillatory movement to the shell in the event of irregularities in the construction of the head or borings through which the shell passes and also any irregularities in the shape of any gasket to be connected to the gasket D'. This oscillating movement of the shell H' will be permitted at the point where the same passes through the ring by reason of the convexed inner periphery of said ring.

By the provision of the particular interlocking means between the projecting portion of the shell with its circumferential rib upon the projection thereof with the groove in the gasket, it will be noted that a means is provided whereby the gasket may be conveniently removed from its seat from the rear when the ring Y is removed. An important desideratum in the present invention, is the means afforded whereby the gasket, ring, spring and shell may not conveniently be detached from each other when removed for any purpose.

What I claim to be new is:—

A pipe coupling for fluid pressure coupler heads comprising, in combination with the coupler heads, each having a chamber which is shouldered upon its inner surface, a gasket with a flange at its inner end designed to engage said shoulder and provided with an undercut groove formed in the inner marginal edge of the flanged end, a ring fitted within the opening in the chamber and having a shoulder formed in the wall of the opening therein, a shell having a flange at one end adapted to engage the flange at the end of said gasket and the part of the shell adjacent to the flanged end thereof being contracted and having an annular groove to engage said undercut portion of the gasket, a second flange formed upon the circumference of the shell and cooperating with the flange upon said ring to limit the movement of the shell in one direction, and a spring interposed between the ring and flange which abut the flange upon the gasket, as set forth.

In testimony whereof I have hereunto affixed my signature in presence of two witnesses.

LEONIDAS D. WOODRUFF.

Witnesses:
A. L. HOUGH,
FRANKLIN H. HOUGH.

Copies of this patent may be obtained for five cents each, by addressing the "Commissioner of Patents, Washington, D. C."